C. D. KEATOR.
HOOK AND GUARD THEREFOR.
APPLICATION FILED JUNE 22, 1916.
1,298,051.
Patented Mar. 25, 1919.
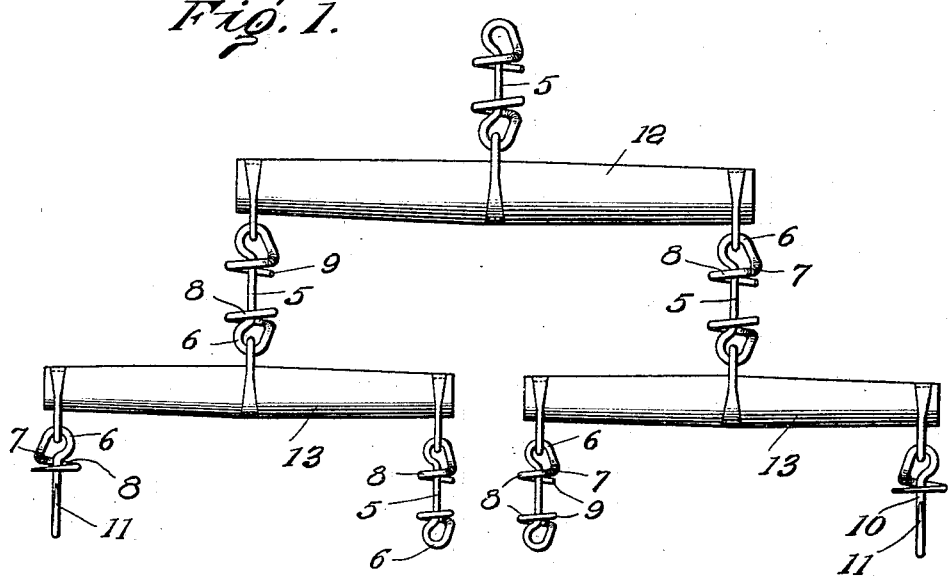
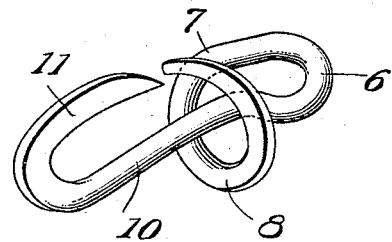
Inventor
Charles D. Keator
By Bedford + Doolittle
Attorneys

UNITED STATES PATENT OFFICE.

CHARLES D. KEATOR, OF CAMPTI, LOUISIANA, ASSIGNOR TO THE CONNECTING LINK COMPANY, INC., OF NATCHITOCHES, LOUISIANA, A CORPORATION OF LOUISIANA.

HOOK AND GUARD THEREFOR.

1,298,051.   Specification of Letters Patent.   Patented Mar. 25, 1919.

Application filed June 22, 1916. Serial No. 105,224.

*To all whom it may concern:*

Be it known that I, CHARLES D. KEATOR, a citizen of the United States, residing at Campti, Natchitoches parish, and State of Louisiana, have invented and discovered certain new and useful Improvements in Hooks and Guards Therefor, of which the following is a specification.

The present invention relates to hooks and guards therefor and consists in the arrangements and combinations of elements hereinafter described and particularly set forth in the claim.

The invention has for its purpose to provide a hook and guard constructed from a single piece, and with the parts so disposed that the guard will in no manner interfere with the use to which the hook is put, or offer any hindrance to placing or removing the hook connecting member.

The invention is designed especially for use as a swingle-tree hook, wherein the guard is adapted to prevent the trace from becoming accidentally detached from the hook; and in this use it is also proposed to employ a double or pair of hooks with guards for connecting together the swingle-tree with the double-tree.

The invention is shown by way of illustration in the accompanying drawing, wherein—

Figure 1 illustrates the application of the device to the draft-gear of vehicles, and Fig. 2 a detail perspective view of a single-hook and guard.

In the construction shown in Fig. 2, the bar or shank 10 is formed at one end with an open or unguarded hook 11, and at its opposite end is constructed with a hook 6 having a spirally extended portion 8, of a single convolution, forming the guard.

Fig. 1 illustrates the application of the invention to the draft-gear of a vehicle, wherein the double-tree 12 is connected to the draw-bar of the vehicle by the construction of double-hook, and similar hooks are employed for connecting the double-tree 12 to the swingle-trees 13. Each swingle-tree is provided with a double form of guarded hook and a hook of the type shown in Fig. 2.

The device is intended for various other uses in addition to those illustrated, to wit. for connecting the links of a chain as an emergency when the chain is broken; to connect ropes to blocks; for stay chains; or for hangers and connecting devices generally.

It is obvious that those skilled in the art may vary the details of construction and arrangement of parts without departing from the spirit of my invention, and therefore I do not wish to be limited to such features except as may be required by the claim.

Having thus described my said invention, what I claim as new and desire to secure by Letters Patent, is:

A device of the class described comprising a cylindrical shank portion, and hooks formed on opposite ends thereof, one of said hooks being bent to extend parallel to said shank and formed with flattened converging sides, and the other of said hooks being bent at its end at right angles to and spirally surrounding said shank, said spiral portion being flattened on opposite sides and tapered toward its extremity.

In witness whereof, I have hereunto set my hand at Washington, District of Columbia, this twentieth day of June, A. D. nineteen hundred and sixteen.

CHARLES D. KEATOR.

Witnesses:
H. H. BYRNE,
E. W. BREAZEALE.

Copies of this patent may be obtained for five cents each, by addressing the "Commissioner of Patents, Washington, D. C."